(12) United States Patent
Lindsay et al.

(10) Patent No.: US 12,234,043 B2
(45) Date of Patent: Feb. 25, 2025

(54) METHOD AND SYSTEM FOR MULTI-OBJECT SPACE DEBRIS REMOVAL

(71) Applicant: Astroscale Holdings Inc., Tokyo (JP)

(72) Inventors: Michael Lindsay, Tokyo (JP); Takashi Iwai, Tokyo (JP)

(73) Assignee: Astroscale Holdings Inc., Tokyo (JP)

( * ) Notice: Subject to any disclaimer, the term of this patent is extended or adjusted under 35 U.S.C. 154(b) by 270 days.

(21) Appl. No.: 17/574,641

(22) Filed: Jan. 13, 2022

(65) Prior Publication Data

US 2022/0227504 A1   Jul. 21, 2022

Related U.S. Application Data

(60) Provisional application No. 63/137,905, filed on Jan. 15, 2021.

(51) Int. Cl.

| | |
|---|---|
| *B64G 1/64* | (2006.01) |
| *B64G 1/00* | (2006.01) |
| *B64G 1/10* | (2006.01) |
| *B64G 1/14* | (2006.01) |
| *B64G 1/24* | (2006.01) |

(Continued)

(52) U.S. Cl.
CPC ............ *B64G 1/646* (2013.01); *B64G 1/002* (2013.01); *B64G 1/1081* (2023.08); *B64G 1/14* (2013.01); *B64G 1/242* (2013.01); *B64G 1/2427* (2023.08); *B64G 1/62* (2013.01); *B64G 1/645* (2013.01); *B64G 1/66* (2013.01)

(58) Field of Classification Search
CPC .... B64G 1/1078; B64G 1/646; B64G 1/6462; B64G 2004/005; B64G 1/4024; B64G 1/1081; B64G 1/242; B64G 1/2427; B64G 1/62

See application file for complete search history.

(56) References Cited

U.S. PATENT DOCUMENTS 5,082,211 A * 1/1992 Werka ..................... B64G 1/40
244/167
5,421,540 A * 6/1995 Ting ........................ B64G 1/623
244/158.1

(Continued)

FOREIGN PATENT DOCUMENTS

| EP | 3121122 A | 1/2017 |
|---|---|---|
| EP | 3156336 A1 | 4/2017 |

(Continued)

OTHER PUBLICATIONS

Pelton. New Solutions for the Space Debris Problem. 2015. (Year: 2015).*

(Continued)

*Primary Examiner* — Joshua J Michener
*Assistant Examiner* — Michael B. Kreiner
(74) *Attorney, Agent, or Firm* — Mintz Levin Cohn Ferris Glovsky and Popeo, P.C.

(57) ABSTRACT

A method for rendezvous with an orbiting object comprising: launching a tug and a servicer into a client orbit; separating the servicer from the tug; and docking the servicer with a client. A system for rendezvous with an orbiting object comprising: a first spacecraft comprising a tug capable of towing a second spacecraft, wherein the second spacecraft is a servicer configured to dock with a tumbling client orbiting object.

7 Claims, 9 Drawing Sheets

(51) Int. Cl.
*B64G 1/62* (2006.01)
*B64G 1/66* (2006.01)

(56) References Cited

U.S. PATENT DOCUMENTS

| | | | | |
|---|---|---|---|---|
| 5,803,407 | A | 9/1998 | Scott | |
| 6,523,784 | B2* | 2/2003 | Steinsiek | B64G 1/1081 |
| | | | | 244/172.6 |
| 6,655,637 | B1* | 12/2003 | Robinson | B64G 1/2427 |
| | | | | 244/172.4 |
| 7,070,151 | B2* | 7/2006 | D'Ausilio | B64G 1/1081 |
| | | | | 244/171.1 |
| 7,216,834 | B2* | 5/2007 | D'Ausilio | G21D 5/02 |
| | | | | 244/172.5 |
| 7,370,834 | B2* | 5/2008 | Scott | B64G 1/242 |
| | | | | 244/164 |
| 7,823,837 | B2* | 11/2010 | Behrens | B64G 1/6464 |
| | | | | 244/172.4 |
| 7,861,975 | B2* | 1/2011 | Behrens | B64G 1/4024 |
| | | | | 244/172.4 |
| 8,074,935 | B2* | 12/2011 | Gryniewski | B64G 1/14 |
| | | | | 244/172.4 |
| 8,205,838 | B2* | 6/2012 | Moorer, Jr. | F03H 1/0006 |
| | | | | 244/158.6 |
| 8,226,046 | B2* | 7/2012 | Poulos | B64G 1/646 |
| | | | | 244/172.4 |
| 8,464,983 | B2* | 6/2013 | Knirsch | B64G 1/646 |
| | | | | 244/172.4 |
| 8,783,622 | B2* | 7/2014 | Vance | B64G 1/6462 |
| | | | | 244/172.6 |
| 9,022,323 | B2* | 5/2015 | Starke | B64G 1/6462 |
| | | | | 244/158.6 |
| 9,284,073 | B2* | 3/2016 | Bigelow | B64G 1/1078 |
| 9,434,485 | B1* | 9/2016 | Lehocki | B64G 1/403 |
| 9,463,883 | B2* | 10/2016 | Bigelow | B64G 1/44 |
| 9,463,884 | B2* | 10/2016 | Kitazawa | B64G 1/648 |
| 9,714,101 | B1* | 7/2017 | Kaplan | B64G 1/10 |
| 9,840,342 | B2* | 12/2017 | Chambert | B64G 1/6462 |
| 9,873,528 | B2* | 1/2018 | Okada | F16D 63/00 |
| 10,309,798 | B2* | 6/2019 | Maeda | G01B 11/26 |
| 10,407,184 | B2* | 9/2019 | Mori | B64G 1/648 |
| 10,611,504 | B2* | 4/2020 | Halsband | B64G 1/242 |
| 10,625,882 | B2* | 4/2020 | Reitman | B64G 1/26 |
| 10,640,239 | B2* | 5/2020 | Reed | B64G 1/62 |
| 10,723,490 | B2* | 7/2020 | Rasse | B64G 1/222 |
| 10,882,643 | B2* | 1/2021 | Okada | B64G 1/646 |
| 11,117,683 | B2 | 9/2021 | Reitman | |
| 11,440,685 | B2* | 9/2022 | Goff | B64G 1/6462 |
| 11,643,227 | B2* | 5/2023 | Halsband | B64G 1/4282 |
| | | | | 244/172.5 |
| 2006/0145024 | A1 | 7/2006 | Kosmas | |
| 2013/0075534 | A1* | 3/2013 | Taylor | B64G 1/646 |
| | | | | 244/158.6 |
| 2013/0119204 | A1 | 5/2013 | Allen | |
| 2013/0175401 | A1* | 7/2013 | Starke | B64G 1/62 |
| | | | | 244/171.1 |
| 2017/0015444 | A1* | 1/2017 | Okada | B64G 1/36 |
| 2017/0081051 | A1 | 3/2017 | Okada | |
| 2018/0229865 | A1* | 8/2018 | Maeda | B64G 1/646 |
| 2018/0367192 | A1* | 12/2018 | O'Shea | H04B 7/0452 |
| 2019/0023420 | A1 | 1/2019 | Nicholson | |
| 2019/0023421 | A1 | 1/2019 | Nicison | |
| 2019/0023422 | A1 | 1/2019 | Nicholson | |
| 2019/0341721 | A1 | 11/2019 | Goff | |
| 2019/0359357 | A1* | 11/2019 | Shimamura | B64G 1/648 |
| 2019/0367192 | A1 | 12/2019 | Maeda | |
| 2021/0061494 | A1* | 3/2021 | Belieres Montero | |
| | | | | B64G 1/6462 |
| 2021/0086923 | A1* | 3/2021 | Halsband | B64G 1/64 |
| 2021/0300597 | A1* | 9/2021 | Clark | B64G 1/2427 |
| 2023/0406546 | A1* | 12/2023 | Iwai | B64G 1/1081 |
| 2023/0415923 | A1* | 12/2023 | Scheidegger | B64G 1/6462 |
| 2024/0101280 | A1* | 3/2024 | Lindsay | B64G 1/28 |

FOREIGN PATENT DOCUMENTS

| | | |
|---|---|---|
| JP | 08-244697 A | 9/1996 |
| JP | 2000-272600 A | 10/2000 |
| JP | 2003-212199 A | 7/2003 |
| WO | WO 86/150304 | 5/1996 |
| WO | WO 1996/015030 | 5/1996 |
| WO | WO2013/071438 | 5/2013 |
| WO | WO 2019/018819 | 1/2019 |

OTHER PUBLICATIONS

International Search Report and Written Opinion mailed Dec. 21, 2021 in PCT/JP2021/036087.

Blackerby et al, ELSA-D: An In-orbit End-of-Life Demonstration Mission, IAC-18, Sep. 14, 2018.

Caubet, Albert et al., Design of an Attitude Stabilization Electromagnetic Module for Detumbling Uncooperative Targets, IEEE Aerospace Conf Proceedings, Mar. 2014, pp. 1-13.

Udrea, B. et al., "A Cooperative Multi-Satellite Mission for Controlled Active Debris Removal from Low Earth Orbit", 2015 IEEE Aerospace Conf., Mar. 7, 2015.

\* cited by examiner

METHOD AND SYSTEM FOR MULTI-OBJECT SPACE DEBRIS REMOVAL

CROSS-REFERENCE TO RELATED APPLICATION

This application is a nonprovisional patent application of and claims the benefit of U.S. Provisional Patent Application No. 63/137,905, filed Jan. 15, 2021 and titled "Method for Multi-Object Space Debris Removal," the disclosure of which is hereby incorporated herein by reference in entirety.

FIELD

The disclosure relates generally to a servicing spacecraft system and methods of use of a servicing spacecraft system, in particular to a multi-vehicle system for removal of multi-object space debris and associated methods of removal of multi-object space debris. Technologies and/or topics of relevance include active debris removal, on-orbit satellite servicing, space tugs, deorbit devices, fractionated spacecraft, and distributed spacecraft mission.

BACKGROUND

Aging satellites and space debris crowd low-Earth orbit, and regularly launching new satellites adds to the collision risk. Existing methods and systems suffer from significant limitations, including the inability to safely and economically deorbit satellites and debris under some conditions.

The problem to be solved is that it is extremely difficult to design and build a single, monolithic spacecraft that has high delta V while also being nimble and inexpensive enough to be considered disposable. Meeting all three requirements is a unique challenge that has not yet been addressed satisfactorily. In view of the above circumstances, aspects of present invention provide a method and system for multi-object space debris removal that enable safer and/or more economical operation.

A multi-object space debris removal mission requires substantial amounts of delta V as well as the capability to rendezvous with and capture large tumbling objects and the capability to perform precisely targeted atmospheric reentry trajectories in order to minimize risk of harmful collisions with humans, animals, sensitive habitats and property situated on the surface of the Earth. In a solution that utilizes a single, monolithic spacecraft for rendezvous, capture, and disposal, these requirements act against each other.

Achieving high delta V can require massive stores of fuel and/or a very efficient propulsion system (high specific impulse, a measure of how efficiently fuel is utilized) such as solar electric propulsion, which in turn requires large, deployed areas of solar cells with gimbaled control to track the sun vector for adequate power generation.

Rendezvous with and capture of large tumbling objects can require a low-mass and compact spacecraft with minimal deployed and/or protruding components so as to reduce rotational inertia and risk of collision. This allows for a more agile spacecraft that can cancel out its velocity and rotation relative to quickly tumbling debris objects while using less fuel. Fewer protruding components also reduces the combined hard-body collision radius of the spacecraft which allows for wider safe-approach angles required when capturing a debris object.

Performing precisely targeted atmospheric reentry trajectories in order to minimize risk of casualties on Earth can require that during atmospheric reentry, the surviving remnants of the debris object must only impact uninhabited regions on the surface of Earth. As the debris object has no ability to control its trajectory, this guidance must be provided by another spacecraft which may, as a result, burn in the atmosphere along with the debris object. Such a scenario can preclude reusability of this guiding spacecraft.

In engineering a spacecraft, achieving high delta V compels high mass and size, whereas capability for rendezvous with and capture of large tumbling objects requires low mass and size. Both these requirements increase cost, whereas a spacecraft performing precisely targeted atmospheric reentry trajectories may burn in the atmosphere along with the debris object, driving the cost-per-use prohibitively high.

In one conventional solution to aspects of these problems, a device for stabilizing and deorbiting a satellite that comprises a pair of coplanar masts each carrying at least one membrane forming an aerobraking sail, said masts being fixed to the satellite along non-parallel axes and each being provided, on the opposite end thereof to the end thereof fixed to the satellite, with a mass for generating a gravity gradient and for which the masts form, with the bisectrix between the masts, a fixed angle adapted to align the bisectrix with the satellite velocity vector at any altitude, is described in U.S. Pat. No. 10,723,490 issued 28 Jul. 2020 and entitled "Satellite Deorbiting System," incorporated by reference in entirety for all purposes.

Therefore, the challenges or problems of multi-object space debris removal missions include the extreme difficulty of designing and building a single, monolithic spacecraft that has high deltaV while also being nimble and is cheap enough to be considered disposable. Meeting any two of these requirements may be straightforward but meeting all three is a unique challenge that has not been solved by conventional systems or methods.

The disclosure solves the challenges, problems, and/or shortcomings of the conventional candidate approaches or techniques to the multi-object space debris removal mission. In one embodiment, a method of distributing the aforementioned required capabilities across multiple, independent spacecraft which work together to achieve the mission goals. Specifically, the embodiment utilizes a distributed architecture comprising more than one vehicle.

SUMMARY

According to an aspect of the present invention, there is provided a method for rendezvous with an orbiting object comprising: launching a tug and a servicer into a client orbit; separating the servicer from the tug; and docking the servicer with a client.

According to another aspect of the present invention, there is provided system for rendezvous with an orbiting object comprising: a first spacecraft comprising a tug capable of towing a second spacecraft, wherein the second spacecraft is a servicer configured to dock with a tumbling client orbiting object.

In one embodiment, a method for rendezvous with a tumbling client space object, is disclosed, the method comprising: launching a multi-vehicle system comprising: a combined tug-servicer vehicle comprising a tug vehicle and a servicer vehicle, the servicer vehicle configured to dock with a client operating in a first orbit; orbiting the combined tug-servicer vehicle in the first orbit; separating the servicer vehicle from the combined tug-servicer vehicle; docking the servicer vehicle to the client to form a docked servicer-first client; and detumbling the client.

In one aspect, the method further comprises the step of docking the tug vehicle with the client. In another aspect, the method further comprises the step of docking the tug vehicle with the client while the servicer vehicle maintains hold of the client. In another aspect, the method further comprises the step of docking the tug vehicle with the servicer vehicle while the servicer vehicle maintains hold of the client. In another aspect, the method further comprises the step of bringing, by the tug vehicle, the docked servicer-client to a second orbit. In another aspect, the method further comprises the step of docking a reentry shepherd vehicle with the client. In another aspect, the method further comprises the step of placing, by the reentry shepherd vehicle, the client on a reentry trajectory intersecting Earth. In another aspect, the reentry shepherd vehicle guides and controls the client during atmospheric reentry. In another aspect, the method further comprises the step of separating the reentry shepherd from the client. In another aspect, the method further comprises the step of performing refueling the client. In another aspect, the method further comprises the step of performing a repair to the client. In another aspect, the method further comprises the step of altering an orbit of the client. In another aspect, the method further comprises the step of joining one or more components to the client. In another aspect, the method further comprises the servicer vehicle closing a high-bandwidth data link to the tug vehicle using an omni-directional antenna; and the tug vehicle acting as an intermediary communication relay, wherein a high bandwidth data link is enabled to the ground with a directional antenna on the tug vehicle.

In another embodiment, a method of rendezvous with a plurality of target space objects is disclosed, the method comprising: providing a multi-vehicle system comprising: a tug vehicle; a servicer vehicle configured to attach to a first target space object operating in a first orbit; and a reentry shepherd vehicle configured to attach to the first target space vehicle; forming, from the tug vehicle and the servicer vehicle, a combined tug-servicer vehicle operating to rendezvous with the first target space object; separating the servicer vehicle from the combined tug-servicer vehicle; attaching the servicer vehicle to the first target space vehicle; attaching the tug vehicle to the servicer vehicle to form a combined tug-servicer-client vehicle; bringing, using the tug vehicle, the combined tug-servicer-client vehicle to a second orbit; attaching the reentry shepherd vehicle to the combined tug-servicer-client vehicle to form a combined tug-servicer-client-shepherd vehicle operating in the second orbit; separating the tug vehicle and the servicer vehicle from the combined tug-servicer-client-shepherd vehicle to form each of a combined tug-servicer vehicle and a combined client-shepherd vehicle; executing atmospheric reentry of the combined client-shepherd vehicle; and maneuvering the combined tug-servicer vehicle to rendezvous with a second target space object operating in a third orbit.

In one aspect, each of the first target space object and the second target space object are tumbling space debris objects; the servicer vehicle is configured to detumble each of the first target space object and the second target space object; and the reentry shepherd vehicle provides guidance, control, and thrust to maneuver the combined client-shepherd vehicle for executing atmospheric reentry.

In yet another embodiment, a system for rendezvous with an orbiting object is disclosed, the system comprising: a first spacecraft comprising a tug, the tug configured to tow a second spacecraft; wherein: the second spacecraft is a servicer, the servicer configured to dock with a tumbling client orbiting object to form a servicer-client object.

In one aspect, the servicer comprises an omni-directional antenna and the tug comprises a directional antenna. In another aspect, the system further comprises a reentry shepherd configured to guide a client orbiting object on a selectable trajectory. In another aspect, the reentry shepherd is reusable.

In order to comply with 35 U.S.C. Section 112 requirements and to more deeply describe aspects of the disclosure, the following is incorporated by reference in entirety for all purposes: WIPO Appl. No. PCT/JP2021/036087 to Astroscale Holdings Inc. filed 30 Sep. 2021 and entitled "Method and System for Multi-Object Space Debris Removal."

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The disclosed methods and/or systems may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

As used herein, delta V is a measure of the impulse per unit of spacecraft mass that is needed to perform a maneuver such as an in-space orbital maneuver. It is a scalar that has the units of speed.

The phrase "client spacecraft" means a spacecraft operating in-orbit that is to be serviced, such as a client satellite.

The phrase "servicer spacecraft" means a spacecraft that operates in-orbit to perform in-orbit servicing to a client spacecraft.

The term "engage" and the phrase "engaged with" means to be connected with or to connect with, to include, for example, docking with and/or berthing with.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

Figure 1:
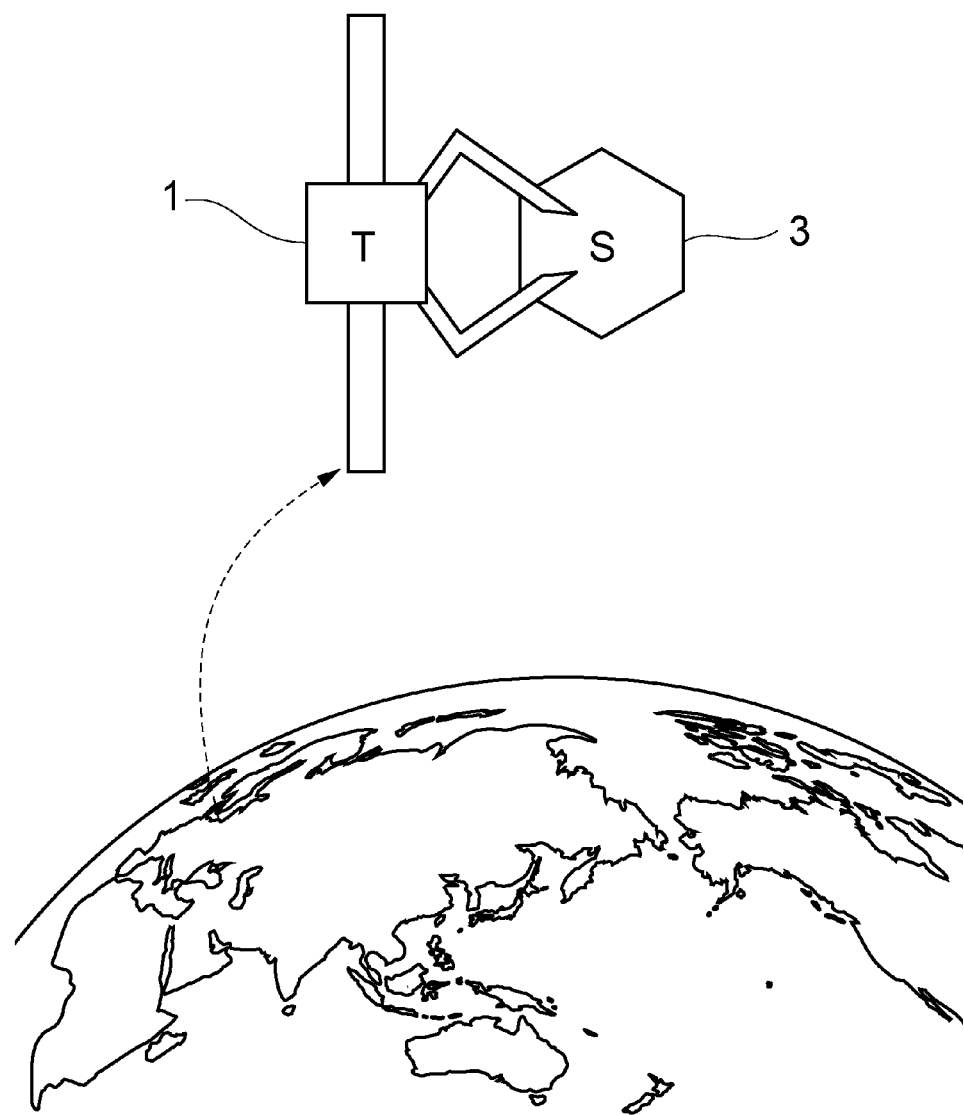
FIG. 1 is a representation of a particular configuration of a first embodiment of a multi-vehicle system for removal of multi-object space debris, the configuration illustrating the launch of a tug together with a servicer into orbit on a dedicated launch vehicle.

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The disclosed devices, systems, and methods of use will be described with reference to FIGS. 1-9. Generally, a multi-vehicle system and associated method for removal of multi-object space debris is disclosed. FIGS. 1-7 provide representations of portions of a particular configuration of one embodiment of a multi-vehicle system for removal of multi-object space debris, each portion generally corresponding to a step described in the method of use of an embodiment of a multi-vehicle system for removal of multi-object space debris is described in FIG. 8.

Although the disclosed devices, systems, and methods of use will be described relative to the removal of multi-object space debris, the devices, systems, and methods of use have other applications. For example, the method and/or devices may be used for the capture, servicing, and/or release of space objects. Other applications or uses are possible.

With attention to FIGS. 1-7, a system for removal of multi-object space debris (also referred to as "multi-object space debris removal system," or simply as "system") comprises three space vehicles: a space tug vehicle 1 also referred to as "tug,", a servicer vehicle 3 also referred to as "servicer," and a reentry shepherd vehicle 7 also referred to as "reentry shepherd" or "shepherd." The three vehicles operate in concert to capture and remove a targeted spacecraft, such as a targeted space debris object, referred to as a client spacecraft 5 or simply as "client." The system and method distributes the aforementioned required capabilities across multiple, independent spacecraft which work together to achieve the mission goals. The method of use of the multi-vehicle system for removal of multi-object space debris may be referred to as "space debris removal method" or simply "method."

The operation and features of the multi-vehicle system for removal of multi-object space debris will be described with reference to particular configurations of the system depicted in FIGS. 1-7.

With attention to FIG. 1, tug 1 is launched together with servicer 3 into orbit on a (wholly or partially) dedicated launch vehicle.

In some embodiments, tug 1 provides substantial amounts of delta V required for large orbit changes, rendezvousing with multiple objects, and re-orbiting massive debris objects. Tug 1 may be configured from several hundred kilograms up to a couple of tons in mass, devoting substantial mass fraction to fuel for electric propulsion (xenon or krypton). Tug 1 may also have multiple thrusters for increased thrust and redundancy, and a large tracking solar array with a wingspan of several meters to maximize solar power generation, which also increases thrust. Tug 1 may or may not include chemical propulsion which may be needed for docking operations only. Typical values for the specific impulse of tug 1 is 1200 s-2000 s, in a preferred configuration in the upper end of that range. Thrust generated by tug 1 may be between 60-240 mN depending on solar power generation and number of thrusters. Tug 1 may also have a very capable attitude/momentum control system that allows it to control a joint stack of multiple bodies that together comprise much more mass than the tug alone.

In some embodiments, servicer 3 is small, light, agile, and designed for docking with both tumbling debris objects and stabilized operational spacecraft to either provide services (such as refueling or repair), detumble, or provide other forms of movement or attitude control to the client.

Servicer 3 may be between 200-400 kg, with mostly body mounted solar panels, and a diverse array of thrusters for maximum agility, typically around a few Newtons in thrust. The bus size may be around a meter cubed, but servicer 3 may also have a device for capture, be it a robotic arm, magnetic capture device, or some other type of interface. The propulsion of servicer 3 may be primarily chemical, but some embodiments of servicer 3 could also have electric propulsion.

Servicer 3 may be capable of operating in all attitude profiles as it approaches tumbling client 5. This makes a directional antenna for ground communication difficult to use, and as such, an omni-directional antenna may be used to close the communications link with the ground in any orientation. The drawback of an omni-directional antenna is that the gain is low, so achievable data rates are also low. Tug 1, however, does not need to do a tumbling capture, so it may have a directional antenna which allows for higher bandwidth communications. Since tug 1 may be in space in relatively close proximity to servicer 3, tug 1 may act as an intermediary comms relay, which allows servicer 3 to close a high-bandwidth data link to tug 1 using an omni-directional antenna, and then the high-bandwidth link to the ground may be enabled via high gain antenna on tug 1. That way, servicer-to-ground communications may be higher throughput than it could be without tug 1.

There are many different expendable and recoverable launch vehicles in use that may be used to launch tug 1 and servicer 3. Currently, government and private parties in the United States and in other countries have developed a variety of launch vehicles, with each of the vehicles optimized for particular missions.

For example, the Atlas V and Delta IV rockets may be used to launch some embodiments. Vulcan Centaur is a successor to the Atlas V under development that includes some Delta IV technology and is expected to have similar capacity. In addition, certain smaller launch vehicles have been developed to launch lighter spacecraft at a lower overall cost, though they have not found a wide commercial market for their use.

Other launch vehicles potentially useful in embodiments include the Falcon family, which consists of three launch vehicles-Falcon 1, Falcon 9, and Falcon Heavy-built by the U.S. corporation SpaceX. Another privately developed launch vehicle which might be suitable in some embodiments is Virgin Orbit's LauncherOne, designed to launch a 300-kg payload to a 500-km altitude low-Earth orbit.

Figure 2:
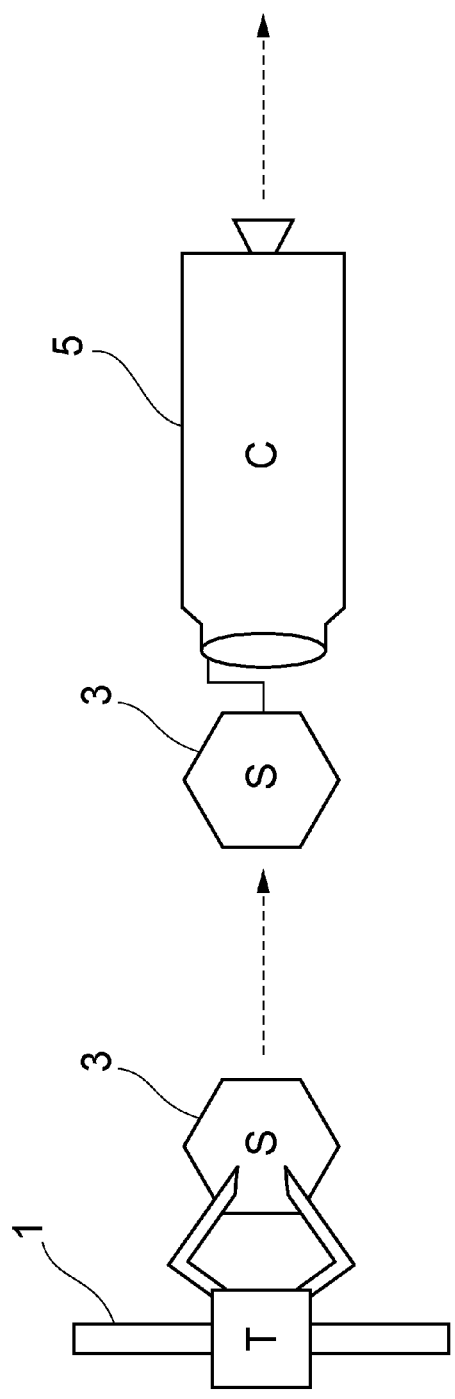
FIG. 2 is a representation of a particular configuration of the first embodiment of a multi-vehicle system for removal of multi-object space debris, the configuration illustrating separation of the servicer from the tug and contact by the servicer with a client desired to be deorbited.

With attention to FIG. 2, the separation of servicer 3 from tug 1 and contact by servicer 3 with client 5 desired to be deorbited is illustrated.

In some embodiments, client 5 is equipped an optical marker before being launched into space. The optical marker reflects light of a predetermined wavelength band radiated from a lighting device of servicer 3; an image of the optical marker which has reflected the light of the predetermined wavelength band is acquired by an image acquisition device of servicer 3; and the image is processed by an image processing device. As a result, servicer 3 can estimate the attitude of the target object.

In some embodiments, a capturing plate can be attached to client 5. The capturing plate can be attached to a part of client 5 where a capturing device bonds with a bonding component of servicer 3, with the bonding component including adhesive. The capturing plate is attached to client 5, whereby the bonding component of servicer 3 can be bonded to the capturing plate of client 5 easily and reliably regardless of the structure or the material of the outer surface of client 5. The capturing plate may include a guide structure to define the bonding position of client 5 with servicer 3. This can improve the accuracy in bonding position of client 5 with servicer 3.

The above-mentioned optical marker and/or capturing plate may utilize aspects and/or features as described in one or more of the following patent matters, all of Astroscale Japan Inc or associated companies, and each incorporated by reference in entirety for all purposes: U.S. Pat. Appl. Publ. No. 2018/0229865 filed 7 Apr. 2017 and entitled "Capturing System, Space Vehicle and Plate;" U.S. Pat. No. 10,882,643 issued 5 Jan. 2021 and entitled "Capturing Plate, On-Orbit Device and Method for Capturing;" U.S. Pat. Publ. Appl. No. 2019/0367192 filed 1 Feb. 2018 and entitled "Capturing System, Aerospace Vehicle, and Plate-Like Body;" and U.S. Pat. No. 10,309,798 issued 4 Jun. 2019 and entitled "Navigation System, Aerospace Vehicle and Optical Marker."

In some embodiments, a set of capture arms extend from servicer 3 and operate to engage client 5, including: at least one servicer umbilical with a servicer umbilical first end attached to the servicer 3 and a servicer umbilical second end fitted with a servicer umbilical end connector, the servicer umbilical end connector configured to form a connection with a client umbilical connector of client 5; a manipulator arm with a manipulator arm first end coupled to servicer 3 and a manipulator arm second end configured to attach to and maneuver the servicer umbilical second end; and a processor operating to control the manipulator arm; wherein: the manipulator arm maneuvers the servicer umbilical second end to form a connection between the servicer umbilical end connector and the client umbilical connector. The engagement or use of an umbilical may, in some embodiments, be as described in U.S. Pat. Appl. Publ. No. 2021/0086923 of Astroscale Israel Ltd. filed 21 Sep. 2020 and entitled "In-Orbit Spacecraft Servicing Through Umbilical Connectors," incorporated by reference in entirety for all purposes.

The docking of the servicer 3 with the client 5 via a set of capture arms may be facilitated by geometries or configurations of the capture arms, such as the ends of the capture arms, as described in U.S. Pat. No. 10,611,504 issued 7 Apr. 2020 and entitled "Docking System and Method for Satellites;" U.S. Pat. No. 10,625,882 issued 21 Apr. 2020 and entitled "Service Satellite for Providing In-Orbit Services Using Variable Thruster Control;" and U.S. Pat. No. 11,117,683 issued 14 Sep. 2021 and entitled "Service Satellite for Providing In-Orbit Services Using Variable Thruster Control;" each of Astroscale Israel Ltd. and incorporated by reference in entirety for all purposes.

In some embodiments, servicer 3 may include a variety of structures for providing an attachment to client 5. A rigid system of attachment hardware could include brackets, clamps, bolts, and screws. A non-rigid system could include a combination of tethers or elastic elements. "Lock and key" style elements may be attached to client 5 to facilitate the attachment process. For example, various forms of connectors could be attached to client 5 and then connected to the complementary part of tug 1.

Client 5 may vary across a wide range of sizes and shapes. Client 5 may be a small piece of debris less than 10 cm in diameter or client 5 can be a large satellite weighing many tons. There are millions of pieces of debris in Low Earth Orbit (between 800-2,000 km) where most satellites operate that are too small to be tracked. Around 35,000 pieces of space debris over 10 cm in diameter have been individually tracked. Around 9,000 satellites have been launched into Low Earth Orbit of which only about 2,000 are operational, with the majority of the remainder still orbiting. Around 60% of satellites in orbit are non-functional and undesirable debris.

About 24% of the individually tracked debris objects are obsolescent satellites, and about 18% are spent upper stages and mission-related objects such as launch adapters and lens covers. Even bits of space debris only 1 cm in diameter can harm a satellite because collision would occur at a high velocity. It is believed that a fragment of space debris larger than 1 centimeter is capable of penetrating the outer walls of existing satellites and spacecraft, which can cause catastrophic failure if the walls are not reinforced with additional layers.

A typical impact with space debris occurs at a closing velocity of 10 km/s, equal to 36,000 km/hr. An object needs to be accelerated to a velocity of around 7 km/s to stay in low Earth orbit. Velocities of objects in space are determined by the laws of physics and the gravitational field of the body around which the objects orbit. Objects can be found in many different orbits around the Earth, some travelling in the opposite direction to others.

Figure 3:
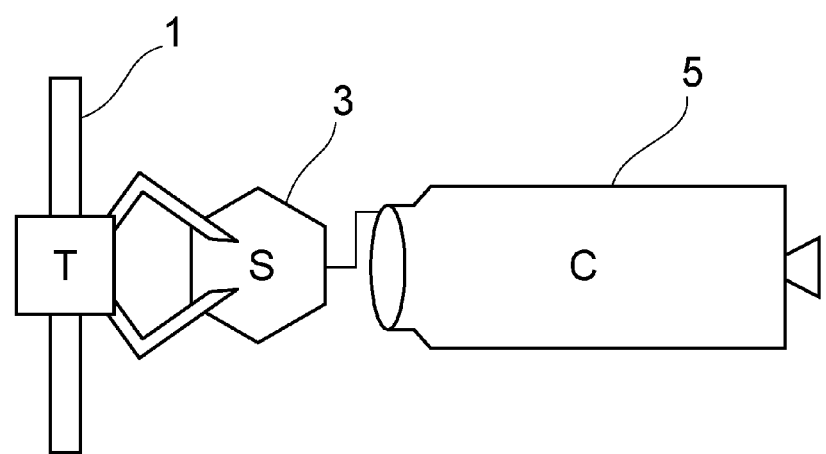
FIG. 3 is a representation of a particular configuration of the first embodiment of a multi-vehicle system for removal of multi-object space debris, the configuration illustrating docking by the tug with the servicer while the servicer maintains hold of the client.

With attention to FIG. 3, a docking by tug 1 with servicer 3 while servicer 3 maintains hold of client 5 is illustrated.

Docking of spacecraft is the joining of two space vehicles. This connection can be temporary, or partially permanent such as for space station modules. Docking specifically refers to joining of two separate free-flying space vehicles. For orbital rendezvous to occur, both spacecraft must be in the same orbit, and the position and the rotation of the spacecraft in the orbit must be matched. Prior to docking tug 1 and servicer 3, the translational and angular speed of tug 1 and servicer 3 generally must be made equal.

To achieve the object, in one embodiment, a rotation suppressing device may be supplied for suppressing rotation of client 5, and can include: a body; a shaft extending outward from the body and configured to rotate about a first rotation axis; a rotation part attached to an end of the shaft opposite to the body and configured to rotate about a second rotation axis together with the shaft; a capture part fixed to the rotation part and configured to capture the target; a braking part provided in the body and configured to suppress rotation of the shaft; and a body rotation suppressing part configured to suppress rotation of the body occurring when the braking part operates. The body rotation suppressing part may be a reaction wheel provided inside the body, for example. With this configuration, the capture part can capture client 5, and the rotation part fixed to the capture part and the shaft attached to the rotation part can rotate together with client 5. Then, the braking part gradually suppresses rotation of the shaft, and the body rotation suppressing part suppresses rotation of the body occurring when the braking part operates. That is, the capture part, for example, rotates integrally with client 5, and this rotation is suppressed by the braking part, thereby suppressing rotation of the body occurring when the braking part operates (i.e., an angular momentum of client 5 is moved to the body rotation suppressing part and absorbed therein with the position of the body maintained). As a result, rotational motion of client 5 that is relatively large (has a large angular momentum) can be effectively suppressed.

Docking and berthing systems on tug 1, servicer 3, and client 5 may be either androgynous or non-androgynous, depending on the design of attachment pieces. Early systems for conjoining spacecraft were all non-androgynous docking system designs. Non-androgynous designs are a form of gender mating where each component of an interface to be joined has a unique design (e.g., "male" shape or "female" shape) and a specific role to play in the docking process. The roles cannot be reversed and two spacecraft with identical connecting attachments cannot be joined. An androgynous docking (and androgynous berthing) scheme by contrast uses an identical interface on all spacecraft so equipped, which can be used to connect the vehicles.

In one embodiment, the servicer 3 employs techniques, components, and/or elements described in U.S. Pat. Appl. No. 63/137,680 filed 14 Jan. 2021 and entitled "Method for Capture of Tumbling Space Debris" to Astroscale Holdings Inc., incorporated by reference in entirety for all purposes.

In one embodiment, the client 5 is a tumbling spacecraft and the positioning of the servicer 3 relative to the client 5 is as described in ELSA-D: An In-orbit End-of-Life Demonstration Mission, Blackerby et al, IAC-18, Sep. 14, 2018, incorporated by reference in entirety for all purposes.

In some embodiments, client 5 may lack any means of propulsion, such as if client 5 has no remaining fuel stores. Servicer 3 can guide the motion of client 5 to facilitate formation of a complex with tug 1. Tug 1 and servicer 3 may be equipped with computerized control systems, which can use data gathered by scanning LIDAR ranging sensors and infrared and visible cameras in guiding motion of client 5.

Figure 4:
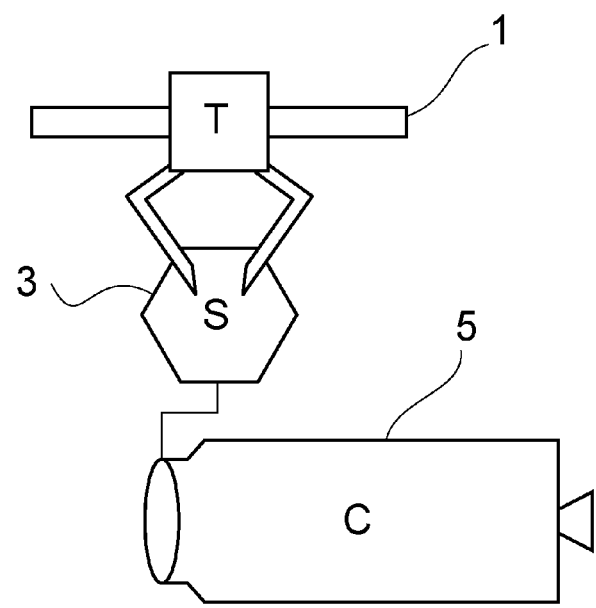
FIG. 4 is a representation of a particular configuration of the first embodiment of a multi-vehicle system for removal of multi-object space debris, the configuration illustrating the tug bringing the servicer attached to the client to a lower orbit.

With attention to FIG. 4, tug 1 is illustrated bringing servicer 3 attached to client 5 to a lower orbit.

If tug 1 generates thrust in the opposite direction to its current direction of motion, tug 1, servicer 3, and client 5 can drop into a lower-energy elliptical transfer orbit. Tug 1 can then generate thrust to insert tug 1, servicer 3, and client 5 into a corresponding lower-energy circular orbit. Conversely, if tug 1 generates thrust in the same direction as its current direction of motion, tug 1, servicer 3, and client 5 can rise into a higher-energy elliptical transfer orbit. Tug 1 can then generate thrust to insert tug 1, servicer 3, and client 5 into a corresponding higher-energy circular orbit.

In embodiments a Hohmann transfer orbit may provide one manner of moving tug 1, servicer 3, and client 5 into a higher or lower orbit. A Hohmann transfer orbit is tangent to both the current orbit of tug 1, servicer 3, and client 5 and a desired orbit. A change of orbit is initiated by propulsion of tug 1, servicer 3, and client 5 in the direction of motion to accelerate tug 1, servicer 3, and client 5 along the elliptical Hohmann transfer orbit if going to a higher orbit, or by propulsion against the direction of motion to decelerate tug 1, servicer 3, and client 5 if transition to a lower orbit is desired. When tug 1, servicer 3, and client 5 arrive at the point of tangency between the Hohmann transfer orbit and the desired orbit, tug 1, servicer 3, and client 5 can accelerate to change its motion so that tug 1, servicer 3, and client 5 travel in the desired orbit.

As used herein, lower orbit means an orbit with lower altitude when measured from the center of the Earth, and higher orbit means are orbit with higher altitude when measured from the center of the Earth. Orbits can be described and classified according to a number of classification systems. A low-Earth orbit (LEO) is an Earth-centered orbit with an altitude of 2,000 km (about 1,200 mi) or less. Higher orbit classes include medium Earth orbits, sometimes called intermediate circular orbits (ICO), and further above, geostationary orbits. An object in geostationary orbit moves at the same angular velocity as the rotation of the Earth, and so from the vantage point of the surface of Earth remains at a single point in the sky. A high Earth orbit is a geocentric orbit with an altitude entirely above that of a geosynchronous orbit (35,786 kilometers (22,236 mi)).

Objects in low altitude orbits (below about 500 km) are affected by atmospheric drag. Atmospheric drag reduces the kinetic energy of orbiting objects, so that the objects correspondingly decrease in altitude until re-entering the atmosphere. Atmospheric drag can thus remove objects from orbit without human intervention. Objects in lower orbits will be affected to a greater degree by atmospheric drag and will accordingly decay faster. The decay lifetime of a space object depends on its altitude, the level of solar activity, and the object's mass to cross-sectional area. Objects with a large mass to area ratio will decay more slowly as they are less affected by drag. High solar activity increases the density of the atmosphere and atmospheric drag in low Earth orbits. For objects orbiting at relatively low altitudes, atmospheric drag can be sufficiently strong to cause a re-entry before the intended end of mission if orbit raising maneuvers are not executed from time to time. On the average, if client 5 is in an initial 300 km high orbit, client 5 will have a decay lifetime of only a few months. If client 5 is in a 500 km orbit, its lifetime will be around 10 years, and if client 5 is at 1000 km altitude client 5 can stay in orbit for thousands of years without the intervention of outside forces acting upon client 5.

In some embodiments, rather than moving client 5 to a lower orbit, the complex formed by tug 1 and servicer 3 move client 5 to a higher orbit known as a graveyard, junk, or disposal orbit. For satellites in geostationary orbit and geosynchronous orbits, the graveyard orbit is a few hundred kilometers above the operational orbit.

Figure 5:
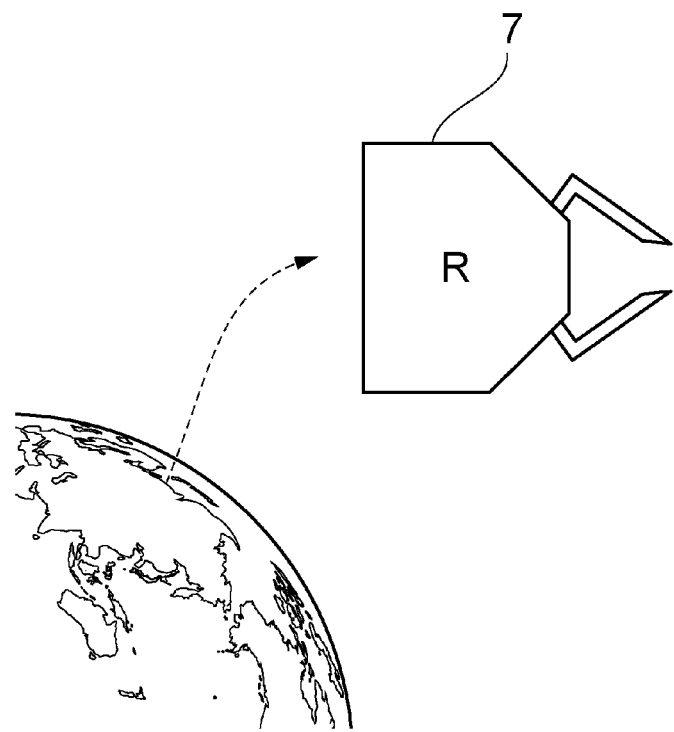
FIG. 5 is a representation of a particular configuration of the first embodiment of a multi-vehicle system for removal of multi-object space debris, the configuration illustrating the launch of a reentry shepherd.

With attention to FIG. 5, reentry shepherd 7 is launched.

In some embodiments, reentry shepherd 7 may be designed to provide guidance, control, and/or thrust to a debris object for the specific purpose of targeted atmospheric reentry. Reentry shepherd 7 may accordingly be equipped with chemical or electric propulsion systems. In some embodiments, reentry shepherd 7 may be outfitted with attachments which can be applied to a client in order to increase atmospheric drag. Drag devices can increase the cross-sectional area of a satellite to cause the atmosphere to slow the satellite and lower the satellite's altitude, but these devices may not assure a particular re-entry location such as the South Pacific Ocean Uninhabited Area.

Reentry shepherd 7 may be anywhere from a few hundred kg to a couple of tons in mass. Debris objects around 3 tons will require a smaller reentry shepherd than debris objects that are 8 tons, for example. The design of reentry shepherd 7 is assumed to be based on the kick stages of launch vehicles, such as the Photon by Rocket Lab, or Fregat by Soyuz. The last stage of typical launch vehicles has significant thrust (hundreds of Newtons) which helps with reentry burns because a large amount of impulse must be imparted quickly. The final reentry process cannot take more than one burn because the final maneuver usually must lower the perigee from ~180 km to 50 km to be successful. Having a perigee between those altitudes will usually result in a loss of control of due to aerodynamic disturbances, but not an immediate atmospheric reentry and thus a mission failure. A large thruster helps make sure a single burn will impart enough impulse to sufficiently change the perigee.

Reentry shepherd 7 may typically have a mass in between the tug and servicer. Reentry shepherd 7 does not need the agility of servicer 3 and does not need the longevity and fuel efficiency of tug 1. Reentry shepherd 7 just needs substantial impulse and thrust. Reentry shepherd 7 is, in one embodiment, an augmented kick stage of launch vehicles. It is possible that that all three vehicles—tug 1, servicer 3, and reentry shepherd 7—could be launched together in some embodiments, while in others they can all be launched separately. The architecture is flexible. Reentry shepherd 7 may also be launched several months after the tug and servicer, waiting for an optimal time to bring client 5 down from a higher altitude to lower altitude. This allows some flexibility in development, deployment, and operation timelines, as deploying multiple spacecraft at the same time can be burdensome. Having the architecture be configurable in different ways also allows for flexibility in launch vehicle selection.

Figure 6:
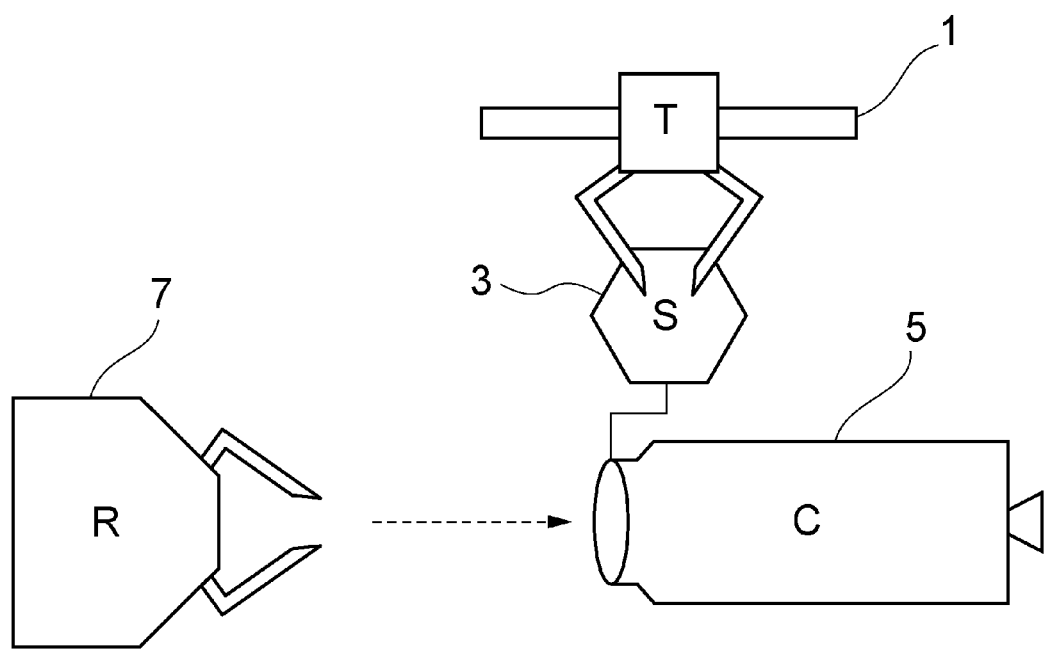
FIG. 6 is a representation of a particular configuration of the first embodiment of a multi-vehicle system for removal of multi-object space debris, the configuration illustrating the reentry shepherd docking with the client, which is held stable by the servicer attached to the tug.

With attention to FIG. 6, a reentry shepherd 7 docking with client 5, which is held stable by servicer 3 attached to tug 1, is illustrated.

Client 5 may be held stable by means of magnetic, mechanical, or other forces. Servicer 3 can for example include permanent magnets to facilitate holding after successful docking. Magnetic force can be generated in servicer 3 using superconducting wires cooled to cryogenic temperatures. Client 5 may have on-board magnets intended to adjust the orientation of client 5 using Earth's magnetic field which can be utilized by servicer 3 for the purpose of attracting or repelling client 5 or to shift the orbit of client 5. Servicer 3 may also be equipped with robotic arms or other mechanical means for holding client 5.

Docking servicer 3 with client 5 may be difficult, but after servicer 3 has control, subsequent docking operations will be simplified. Servicer 3 may grasp a small section of client 5, and leave significant area for another spacecraft, such as reentry shepherd 7, to approach and grasp that same interface. This may be achieved by extending the robotic arm of servicer 3 which allows servicer 3 to get out of the way of another approaching spacecraft, as depicted in FIG. 6. In this operation, servicer 3 may even provide optical guidance to reentry shepherd 7 via retroreflectors or LEDs positioned on a robotic arm or end-effector of servicer 3. As client 5 may not have optical fiducials which aid docking, the ability of servicer 3 to provide this guidance to reentry shepherd 7 is a significant advantage.

Figure 7:
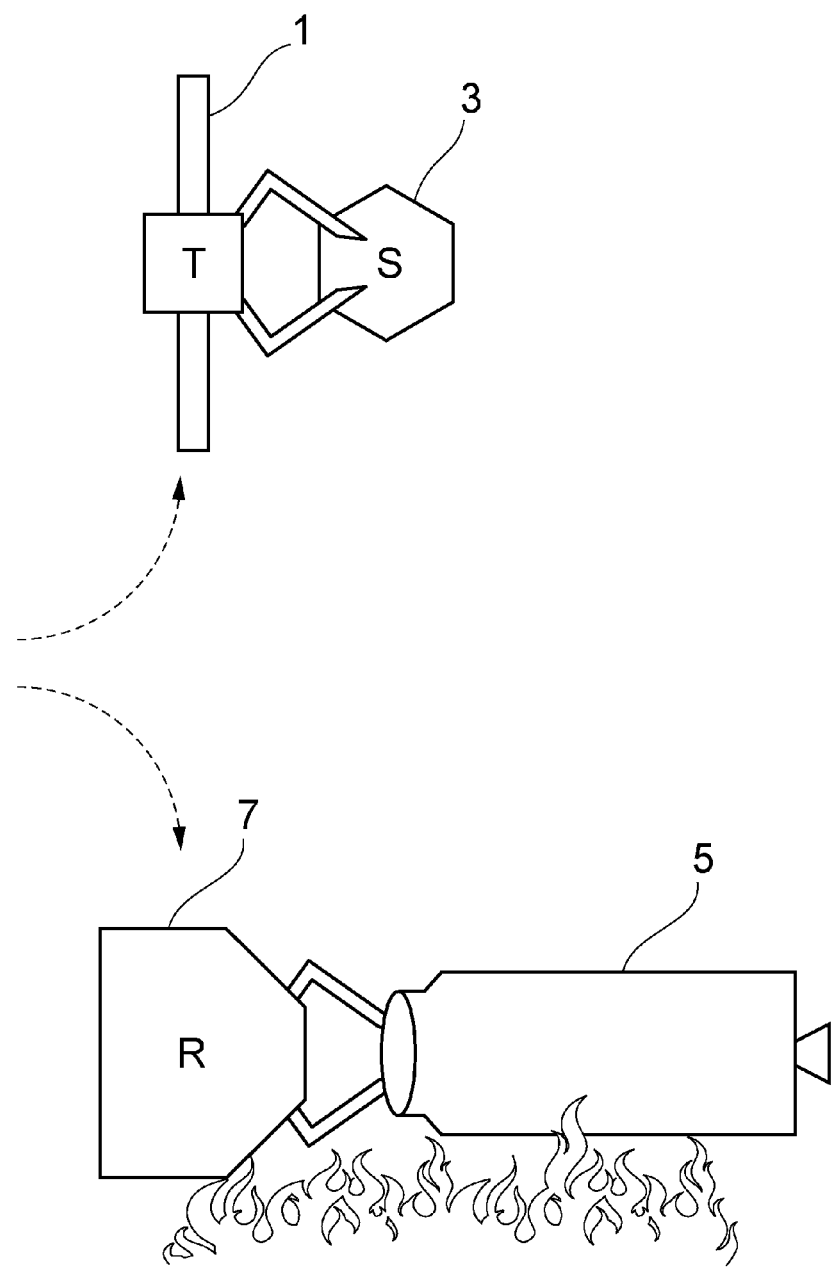
FIG. 7 is a representation of a particular configuration of the first embodiment of a multi-vehicle system for removal of multi-object space debris, the configuration illustrating separation of the servicer attached to the tug from the client attached to the reentry shepherd.

With attention to FIG. 7, separation of servicer 3 attached to tug 1 from client 5 attached to reentry shepherd 7 is illustrated. Tug 1 and servicer 3 accelerate in the direction of a next client object. Reentry shepherd 7 uses drag to lower the orbit of client 5 until the orbit is low enough for direct reentry burn.

In an ideal case, client 5 is vaporized entirely during transit through the atmosphere. Heat from the friction of the gasses in Earth's atmosphere burns up client 5 as client's altitude decreases. An approximate rule-of-thumb is that the air temperature in Kelvin around client 5 is equal to the entry speed in meters per second. Thus, at an orbital reentry velocity of 7800 m/s, the temperature may be as high as 7800 K. However, in embodiments, some pieces of client 5 may withstand even this high temperature to reach the surface of Earth and pose a risk of damage to persons and property on the ground.

Some components of client 5 (especially parts which are made of heat resistant materials like titanium) may survive atmospheric re-entry and fall down to Earth. In that case, it may be desirable for reentry shepherd 7 to escort client 5 to a position which will result in reentry over uninhabited areas of the Earth. In embodiments, reentry shepherd 7 may target a particular atmospheric entry point, in order to reduce the likelihood of casualties to persons or property on the surface of the earth. If client 5 has maneuvering capability and still has remaining fuel at the end of its life, client 5 may be positioned so that client 5 reenters over a large area of ocean. If client 5 does not have maneuvering capability and remaining fuel, a new reentry shepherd must be used for each client 5 requiring direct atmospheric reentry, to provide the guidance and control of client 5 required during reentry.

Reentry shepherd 7 may be reusable in the case where client 5 does not need guidance and control once being placed on the desired reentry trajectory intersecting earth. In some embodiments, reentry shepherd 7 may provide a reentry burn at apogee, then undock from client 5, and quickly raise its altitude before it reaches perigee. This maneuver process may have to take a fraction of an orbit period and may have to be automated. Reentry shepherd 7 may use chemical propulsion in this maneuver (in one preferred embodiment, biprop) with a thrust of at least 400N. If reentry shepherd 7 undocks from client 5, significant precision would be required on the reentry burn to ensure the target corridor in the Pacific Ocean is hit. After recovery, reentry shepherd 7 would likely remain at a low orbit, waiting for the next client. Reentry shepherd 7 may potentially be carried by tug 1 to a different altitude.

Tug 1 and servicer 3 are designed to be reused multiple times for multiple clients and may be used with or without the reentry shepherd 7, as some clients may not require direct atmospheric reentry. This reusability of both of these highly capable platforms helps to reduce the cost of disposal per object.

Figure 8:
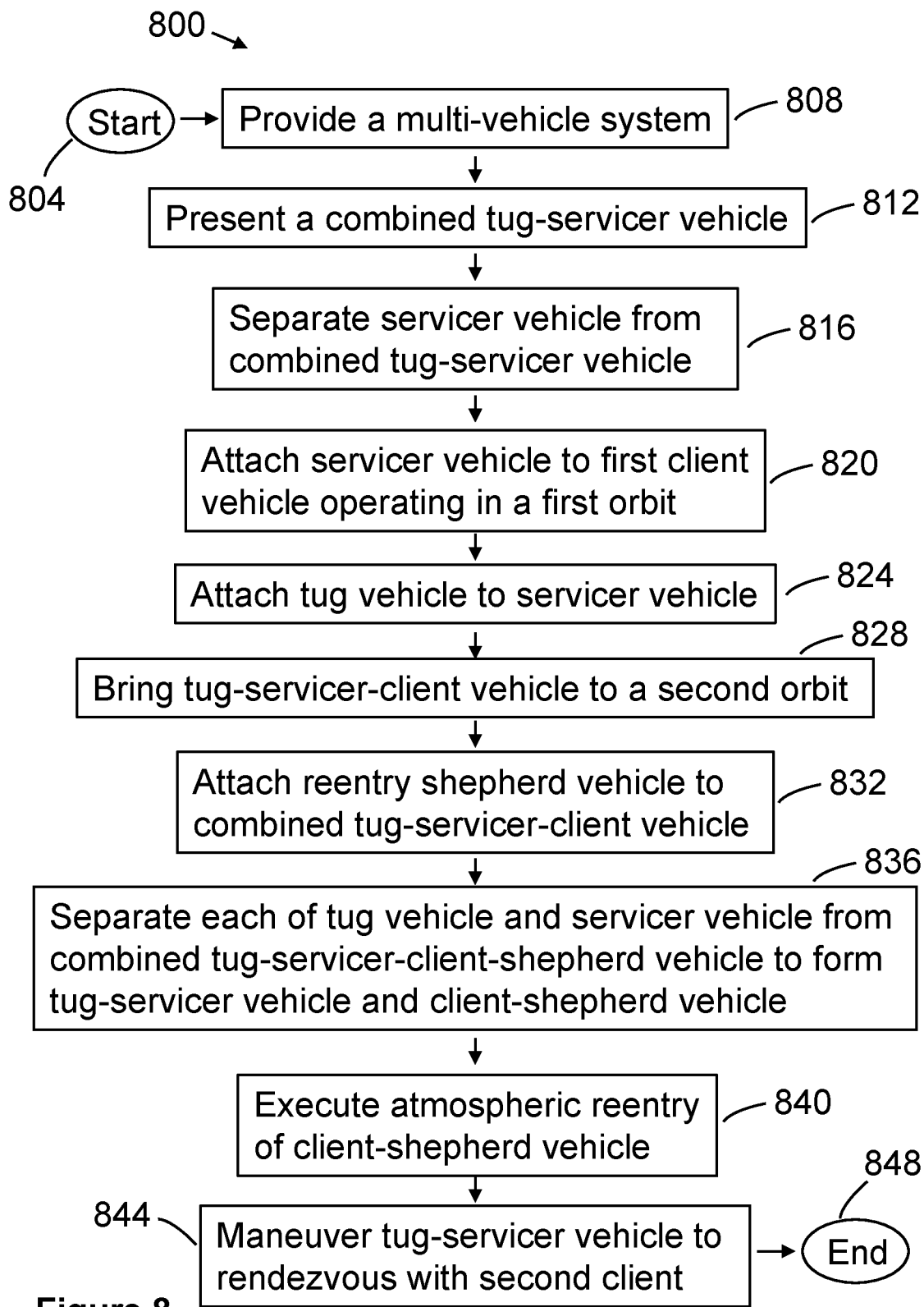
FIG. 8 is a flow diagram of one embodiment of a method of use of the first embodiment of a multi-vehicle system for removal of multi-object space debris.

FIG. 8 provides a flow diagram of one method of use 800 of embodiment of a multi-vehicle system for removal of multi-object space debris described above with respect to FIGS. 1-7.

Generally, the method 800 starts at step 804 and ends at step 848. Any of the steps, functions, and operations discussed herein can be performed continuously and automatically. In some embodiments, one or more of the steps of the method of use 800, to include steps of the method 800, may comprise computer control, use of computer processors, and/or some level of automation. However, in some embodiments some of the steps or parts of some of the steps are performed in concert with or exclusively by human intervention. For example, a final approval (by a human) may be required to initiate a docking, a separation, or transfer of custody from one space vehicle to another.

The steps are notionally followed in increasing numerical sequence, although, in some embodiments, some steps may be omitted, some steps added, and the steps may follow other than increasing numerical order. A user may interact or perform one or more of the described steps be using a display/GUI. The phrase "user interface" or "UI", and the phrase "graphical user interface" or "GUI", means a computer-based display that allows interaction with a user with aid of images or graphics.

After starting at step 804, the method 800 proceeds to step 808. At step 808, a multi-vehicle system for removal of multi-object space debris is provided, such as described above with respect to FIGS. 1-7. After completing step 808, the method 800 proceeds to step 812.

At step 812, a combined tug 1 and servicer 3 vehicle is formed or is presented. In one embodiment, as described above with respect to FIG. 1, the combined tug-servicer vehicle is launched as a common or combined or attached or coupled unit. After completing step 812, the method 800 proceeds to step 816.

At step 816, as described above with respect to FIG. 2, the servicer 3 separates from the combined tug-servicer vehicle. After completing step 816, the method 800 proceeds to step 820.

At step 820, the servicer 3 attaches or docks with the client 5, the client 5 operating in a first orbit, as described above with respect to FIG. 2. In one embodiment, the client 5 is a tumbling client. In one embodiment, the servicer 3 docks with or attaches to the client 5 while the client 5 is tumbling. In one embodiment, the servicer 3 detumbles to tumbling client 5. After completing step 820, the method 800 proceeds to step 824.

At step 824, the tug 1 attaches to the servicer 3, the servicer 3 in turn still attached or docked to the client 5, as described in FIG. 3 above. After completing step 824, the method 800 proceeds to step 828.

At step 828, the tug 1 brings the combined tug-servicer-client vehicle to a second orbit, as described above with respect to FIG. 4. After completing step 828, the method 800 proceeds to step 832.

At step 832, the reentry shepherd is attached to the combined tug-servicer-client, as described above with respect to FIG. 6. After completing step 832, the method 800 proceeds to step 836.

At step 836, the tug vehicle and servicer vehicle are separated from the combined tug-servicer-client-shepherd vehicle to form each of a tug-servicer vehicle and a client-shepherd vehicle, as described above with respect to FIG. 7. After completing step 836, the method 800 proceeds to step 840.

At step 840, the client-shepherd vehicle executes atmospheric reentry, as described above with respect to FIG. 7. After completing step 840, the method 800 proceeds to step 844.

At step 844, the tug-servicer vehicle maneuvers to rendezvous with a second client, as described above with respect to FIG. 7. After completing step 844, the method 800 proceeds to step 848 and ends.

Figure 9:
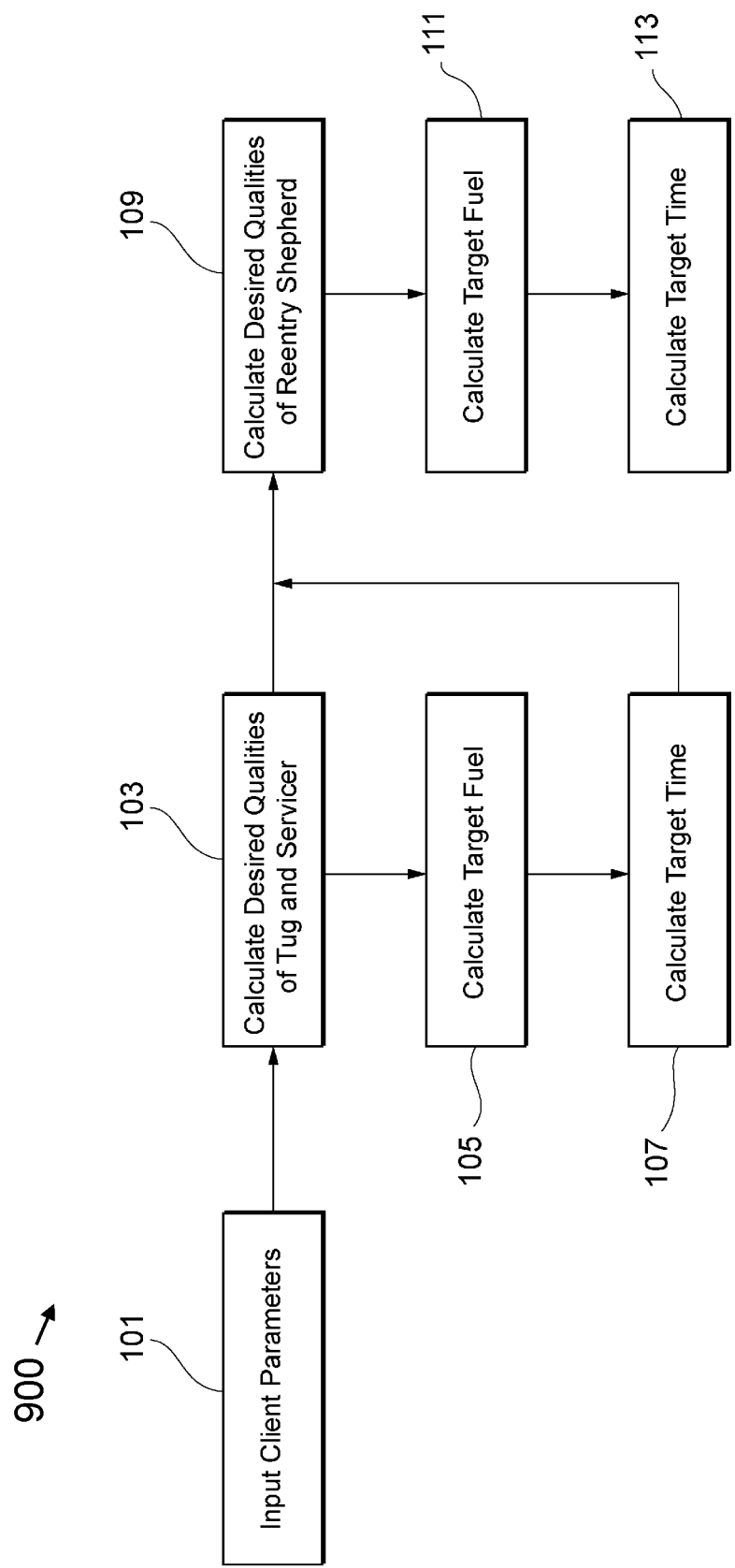
FIG. 9 is a block diagram of one embodiment of a method of designing spacecraft useful for rendezvous, capture, and disposal of an orbiting object, such as the disclosed multi-vehicle system for removal of multi-object space debris.

With attention to FIG. 9, a flow diagram illustrating steps in a computer-implemented method of designing spacecraft useful for rendezvous, capture, and disposal of an orbiting object that is the subject of one embodiment. In embodiments, many variations on this method are possible, and in fact it is likely that the order of steps may be changed from one embodiment to another. Any of the steps, functions, and operations discussed herein can be performed continuously and automatically. In some embodiments, one or more of the steps of the method of use 900, to include steps of the method 900, may comprise computer control, use of computer processors, and/or some level of automation.

One embodiment is computer-implemented method of calculating parameters of a spacecraft comprising: inputting, via one or more devices 101, attributes of one or more target clients; and calculating, at one or more processors 103, desired qualities of one or more tugs and/or one or more servicers according to a ranking previously defined. Devices can be various computer hardware such as a mouse, a keyboard, or various memory types.

Desired qualities can be various design and aeronautical parameters associated with the projected performance of a tug and/or a servicer. Thus, output of desired qualities can provide useful information about manufacturing processes for tugs and servicers, including materials used, sizes of components and assemblies, and shapes of components and assemblies. As well, reentry shepherds can be constructed according to desired qualities output from embodiments.

Desired qualities can be output in various data formats, including various spreadsheet and various word processing programs, as well as various file formats which can be used in Computer-Aided Design.

Previously defined rankings can weight, in response to data received about a client, different design and aeronautical parameters in different amounts according to mission objectives associated with rendezvous and disposal with that client. Previously defined rankings can be input via an I/O device such as a keyboard, mouse, or memory.

Other embodiments can comprise calculating 105 target weights of a fuel for one or more of the tug, servicer, and reentry shepherd. Still other embodiments can comprise calculating 107 a target time of one or more of launch, rendezvous and disposal of among one or more of tugs, servicers, reentry shepherds and clients.

Computer hardware such as a processor useful for implementing an embodiment may also be equipped for calculating 109 desired qualities of a reentry shepherd according to a ranking previously defined. In embodiments desired qualities of one or more reentry shepherds can but need not be calculated at the same time. In other words, step 109 can occur simultaneously with steps 101 and 103, or step 109 can occur later, and then can be followed by step 111 and step 113.

The embodiments described above are given for the purpose of facilitating the understanding of the present invention and does not intend to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

The exemplary systems and methods of this disclosure have been described in relation to systems and methods of use of providing multi-object space debris removal, such as removal of one or more client satellites. Other uses or applications to the disclosed systems and methods are possible, such as servicing of satellites. Also, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of rendezvous with a plurality of target client space objects, the method comprising:
   providing a multi-vehicle system comprising:
   a tug servicer vehicle configured to attach to a first target client space object operating in a first orbit; and
   a reentry shepherd vehicle configured to attach to the first target client space object;
   operating the tug servicer vehicle to rendezvous with the first target client space object;
   attaching the tug servicer vehicle to the first target client space object to form a combined tug servicer client vehicle;
   bringing, using the tug servicer vehicle, the combined tug servicer client vehicle to a second orbit;
   attaching the reentry shepherd vehicle to the combined tug servicer client vehicle to form a combined tug servicer client shepherd vehicle operating in the second orbit;
   separating the tug servicer vehicle from the combined tug servicer client shepherd vehicle to form each of the tug servicer vehicle and a combined client shepherd vehicle;
   executing atmospheric reentry of the combined client shepherd vehicle; and
   maneuvering the tug servicer vehicle to rendezvous with a second target client space object.

2. The method of claim 1, wherein:
   each of the first target client space object and the second target client space object are tumbling space debris objects;
   the tug servicer vehicle is configured to detumble each of the first target client space object and the second target client space object; and
   the reentry shepherd vehicle provides guidance, control, and thrust to maneuver the combined client shepherd vehicle for executing atmospheric reentry.

3. The method of claim 1, wherein the combined client shepherd vehicle comprises the reentry shepherd vehicle docked with the first target client space object.

4. The method of claim 1, further comprising the step of placing, by the reentry shepherd vehicle, the first target client space object on a reentry trajectory intersecting Earth.

5. The method of claim 1, wherein the reentry shepherd vehicle guides and controls the combined client shepherd vehicle during atmospheric reentry.

6. The method of claim 1, further comprising the step of separating the reentry shepherd from the first target client space object before the first target client space object executes atmospheric reentry.

7. The method of claim 1, wherein the second target client space object operates in a third orbit.

* * * * *